United States Patent
Nguyen et al.

(10) Patent No.: US 12,180,424 B1
(45) Date of Patent: Dec. 31, 2024

(54) METHODS AND COMPOSITIONS USED IN CONTROLLING FORMATION SAND PRODUCTION, PROPPANT FLOWBACK, AND FINES MIGRATION

(71) Applicant: Halliburton Energy Services, Inc., Houston, TX (US)

(72) Inventors: Philip D. Nguyen, Houston, TX (US); Shoy George, Pune (IN); Sumit Konale, Pune (IN); Ronald Glen Dusterhoft, Houston, TX (US); Michael Wayne Sanders, Houston, TX (US); Antonio Recio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/236,561

(22) Filed: Aug. 22, 2023

(51) Int. Cl.
*E21B 43/26* (2006.01)
*C09K 8/80* (2006.01)
*E21B 43/16* (2006.01)

(52) U.S. Cl.
CPC .............. *C09K 8/805* (2013.01); *E21B 43/26* (2013.01); *E21B 43/16* (2013.01)

(58) Field of Classification Search
CPC ........ C09K 8/1805; E21B 43/26; E21B 46/16
See application file for complete search history.

(56) References Cited

U.S. PATENT DOCUMENTS

| | | |
|---|---|---|
| 3,593,796 A | 7/1971 | Stainback et al. |
| 3,800,847 A | 4/1974 | Rike |
| 3,865,600 A | 2/1975 | Pearson et al. |
| 4,417,623 A | 11/1983 | Anthony |
| 5,088,555 A | 2/1992 | Shu |
| 5,101,901 A | 4/1992 | Shu et al. |
| 5,937,949 A | 8/1999 | Lezzi et al. |
| 7,111,683 B2 | 9/2006 | Nelson et al. |
| 7,284,610 B2 | 10/2007 | Poelker et al. |
| 7,703,522 B2 | 4/2010 | Huang |
| 7,740,068 B2 | 6/2010 | Ballard |
| 8,479,819 B2 | 7/2013 | James |
| 8,567,481 B2 | 10/2013 | Garcia-Tapia et al. |
| 9,212,304 B2 | 12/2015 | McDonald |
| 9,708,527 B2 | 7/2017 | Nguyen |
| 9,738,823 B2 | 8/2017 | Reyes |
| 10,293,372 B2 | 5/2019 | Buvid et al. |
| 10,975,292 B2 | 4/2021 | Nguyen et al. |
| 11,084,974 B2 | 8/2021 | Dhawan et al. |
| 11,208,591 B2 | 12/2021 | Monastiriotis et al. |
| 11,434,740 B1 * | 9/2022 | Ngyuen .................. E21B 43/26 |
| 11,499,086 B1 | 11/2022 | Jamison et al. |
| 11,634,625 B2 | 4/2023 | Penny et al. |
| 2004/0023818 A1 | 2/2004 | Nguyen et al. |
| 2004/0235677 A1 | 11/2004 | Nguyen et al. |
| 2013/0233623 A1 | 9/2013 | Aston et al. |
| 2017/0073575 A1 * | 3/2017 | Vo .......................... E21B 43/04 |
| 2019/0128068 A1 * | 5/2019 | Danko ................... E21B 47/022 |
| 2019/0309610 A1 * | 10/2019 | Nguyen ................ C04B 28/006 |
| 2020/0048541 A1 * | 2/2020 | Montenegro Galindo ................. C09K 8/882 |
| 2021/0025623 A1 * | 1/2021 | Holtzman ............... F24T 10/17 |
| 2023/0035268 A1 | 2/2023 | Xu et al. |

FOREIGN PATENT DOCUMENTS

WO      2012069784 A1    5/2012

* cited by examiner

*Primary Examiner* — Silvana C Runyan
(74) *Attorney, Agent, or Firm* — Conley Rose, P.C.; Rodney B. Carroll

(57) ABSTRACT

A method of servicing a well having a wellbore extending from a surface wellsite and penetrating a subterranean formation, can include contacting a binder composition with particulate material, and binding the particulate material with the binder composition to form consolidated particulate material in the wellbore, in the formation, or both. The binder composition can include an aqueous fluid, an alkali metal silicate, and a silicate bonding activator.

15 Claims, 2 Drawing Sheets

METHODS AND COMPOSITIONS USED IN CONTROLLING FORMATION SAND PRODUCTION, PROPPANT FLOWBACK, AND FINES MIGRATION

FIELD

This application relates to a method of servicing a well having a wellbore extending from a surface wellsite and penetrating a subterranean formation. More specifically, this application relates to (i) contacting a binder composition with particulate material, and (ii) binding the particulate material with the binder composition to form consolidated particulate material in the wellbore, in the formation, or both, for drilling, treating, producing, and/or secondary operations such as fracturing.

BACKGROUND

Producing or recovering fluids from subterranean formations can be impacted by collapsing or sloughing of the walls of well boreholes extending into such formations or by backflow of sand towards the wellbore. The very fine particles are subject to movement by fluid flowing at relatively low rates, as compared to larger grains not subject to significant movement at such low rates.

In other operations, such as secondary operations including fracturing, where a relatively large volume of fluid is forced to flow through such a silty or dirty sand, the very fine particles tend to be carried along until they become lodged in the smaller interstices. This plugs the openings and reduces permeability. In wellbore operations such as drilling, treating, producing, and secondary operations, consolidation of fine particles can be a solution to drifting of fine particulates. Consolidation can involve a variety of resins systems placed downhole to clump smaller particles to larger particles to minimize drifting. Thus, an ongoing need exists for improved compositions and methods of consolidating fine particulate material in a wellbore and/or the surrounding formation.

DETAILED DESCRIPTION

Figure 1:
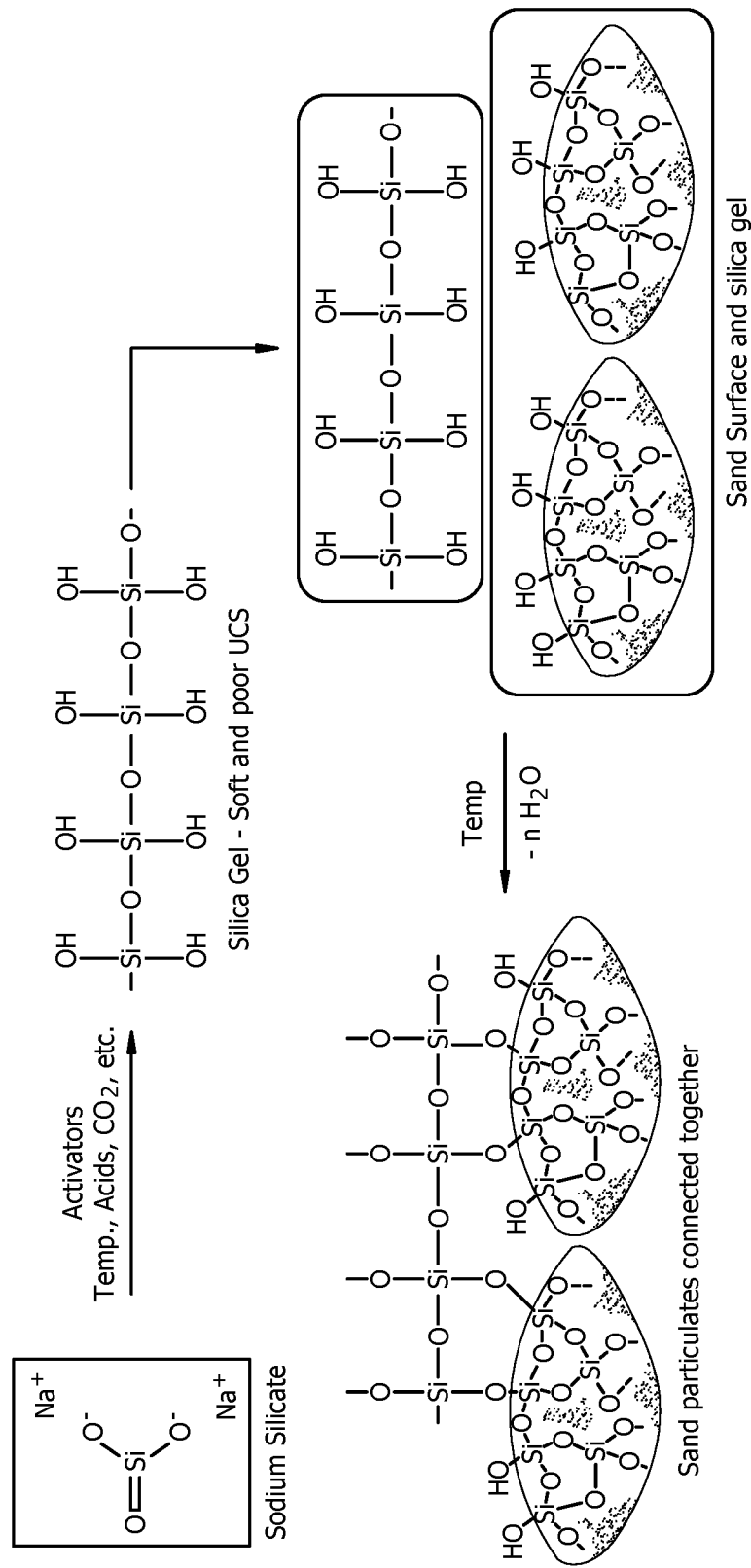
FIG. 1 illustrates the bonding process of sodium silicate on sand surface activated by a bonding activator to form consolidated sand packs. High bonding strength between treated sand grains is established when water is removed as a result of curing temperature and time.

As used herein, carbon(s) in a moiety such as an alkyl, an alkenyl, an alkynyl, an alkylethoxylate, or an alkyloxy can be abbreviated as $C_1$, $C_2$, $C_3$, etc. where "C" represents carbon and the subscript represents the number of carbon atoms in the moiety.

As used herein, the term "and/or" can mean one or more of items in any combination in a list, such as "A and/or B" means "A, B, or the combination of A and B".

The present disclosure relates to an environmentally safe binder compositions and methods used in consolidating particulates for controlling formation sand production, proppant flowback, and fines migration. A binder composition comprises an aqueous fluid, an alkali metal silicate, a silicate bonding activator, and an optional salt-substituted clay stabilizer. The binder is placed in the wellbore (e.g., wellbore wall), the formation surrounding the wellbore, and/or propped fractures extending into the formation, to provide consolidation of particulates, transforming them into hardened, permeable aggregates and/or solid masses to hold them in place during well production. A version of this binder can be dry coated (e.g., placed onto the proppant material such as sand while the sand is in dry state prior to being placed in a mix tub with aqueous carrier fluid) or wet coated (e.g., placed onto the proppant material such as sand while the sand is in wet state after being placed in a mix tub with aqueous carrier fluid) onto the fracturing sand/proppant during a hydraulic fracturing treatment to provide consolidation and keep the proppant in place during well production or injection.

The composition of a silicate binder system (e.g., the binder composition) comprises an aqueous fluid, an alkali metal silicate, and a silicate bonding activator. The binder composition can further comprise a salt-substituted clay stabilizer. Optionally, the binder composition can include a water proofing agent, although the silane compounds described hereinafter can provide some efficacy through hydrophobic modification of a silica pack.

The alkali metal silicates can comprise sodium silicate, potassium silicate, lithium silicate, or any combination thereof. Various forms of silicates comprise of orthosilicate, metasilicate, or pyrosilicate.

The silicate bonding activator can comprise an alkali metal hydroxide selected from the group consisting of sodium hydroxide, potassium hydroxide, calcium hydroxide, magnesium hydroxide, and any combination thereof.

The silicate bonding activator can be selected from weak acids (carbonic acid, formic acid, acetic acid, citric acid, lactic acid), or from hydrolysable esters, which in the later stages produces acids (such as ortho esters, poly(ortho esters), aliphatic polyesters, lactides, poly(lactides), glycosides, poly(glycosides), triglyceride, such as triacetin, lactones, poly(F-caprolactones), poly(hydroxybutyrates), anhydrides; poly(anhydrides), and poly(amino acids), or any combination thereof.

The silicate bonding activator can be a silane or an organosilane selected from alkylsilanes, alkoxysilane, alkyltrialkoxysilanes, methyltrimethoxysilane, methyltriethoxysilane, glycidyloxypropyl trimethoxysilane, γ-glycidyloxypropyl triethoxysilane, 3-aminopropyl trimethoxysilane, 3-aminopropyl triethoxysilane, hydroxymethyl trialkoxysilane, 3-hydoxypropyl trimethoxysilane, 3-hydroxypropyl triethoxysilane, N-hydroxyethylaminopropyl trialkoxysilane, 2-methoxy(polyethyleneoxy)propyl trialkoxysilane, N-2-(aminoethyl)-3-aminopropyl trimethoxysilane, 3-glycidoxypropyl trimethoxysilane, N-beta-(aminoethyl)-gamma-aminopropyl trimethoxysilane, or any combination thereof.

The silicate bonding activator can be an orthosilicate selected from tetra-ethyl orthosilicate (TEOS), tetramethyl orthosilicate (TMOS), tetrapropyl orthosilicate (TPOS), or any combination thereof.

The silicate bonding activator can be an organosiloxane or a polysiloxane selected from poly(alkoxysilanes), polyalkylsiloxanes, polyarylsilanes, such as polydimethylsiloxanes, polydiethylsiloxanes, polymethylethylsiloxanes, poly(dimethoxysiloxanes), poly(diethoxysiloxanes), polydiphenylsiloxanes, polydimethylsiloxanes, poly(diethoxysiloxanes), and corresponding copolymers. The above list can be extended to derivatives of polyalkyl siloxanes such as polydimethylsiloxanes hydroxy terminated, polydiethylsiloxanes hydroxy terminated, polymethylethylsiloxanes hydroxy terminated, polydimethylsiloxane ethoxy terminated, polydiethylsiloxane ethoxy terminated, polymethylethylsiloxanes ethoxy terminated, or any combination thereof.

The silicate bonding activator can be an organo-siloxane or polysiloxane emulsified with one or more surfactants (or emulsifiers) for forming oil-in-water emulsions or microemulsions to allow the organo-siloxane or polysiloxane to be dispersed readily in an aqueous carrier fluid and interact freely with alkali metal silicate.

In an aspect, the binder composition can include: (a) an alkali metal silicate selected from a sodium silicate, a potassium silicate, a lithium silicate, or any combination thereof, and the alkali metal silicate can be further characterized as an orthosilicate, a metasilicate, a pyrosilicate, or any combination thereof, (b) a dehydrating-activator agent selected from an alkylsilane, an alkoxysilane, an alkyltrialkoxysilane, a methyltrimethoxysilane, a methyltriethoxysilane, a glycidyloxypropyl trimethoxysilane, a γ-glycidyloxypropyl triethoxysilane, a 3-aminopropyl trimethoxysilane, a 3-aminopropyl triethoxysilane, a hydroxymethyl trialkoxysilane, a 3-hydoxypropyl trimethoxysilane, a 3-hydroxypropyl triethoxysilane, a N-hydroxyethylaminopropyl trialkoxysilane, a 2-methoxy (polyethyleneoxy)propyl trialkoxysilane, a N-2-(aminoethyl)-3-aminopropyl trimethoxysilane, a 3-glycidoxypropyl trimethoxysilane, a N-beta-(aminoethyl)-gamma-aminopropyl trimethoxysilane, a poly(alkoxysilane), a polyalkylsiloxane, a polyarylsilane, a polydimethylsiloxane, a polydiethylsiloxane, a polymethylethylsiloxane, a poly(dimethoxysiloxanes), a poly(diethoxysiloxanes), a polydiphenylsiloxane, a polydimethylsiloxane, a poly(diethoxysiloxanes), a tetra-ethyl orthosilicate, a tetramethyl orthosilicate, a tetrapropyl orthosilicate, or any combination thereof, and (c) an aqueous fluid (e.g., fresh water).

Aqueous fluids that may be suitable for use in the treatment fluid, methods, and systems may include water from any source. Such aqueous fluids may include fresh water, salt water (e.g., water containing one or more salts dissolved therein), brine (e.g., saturated salt water), seawater, or any combination thereof. In many embodiments, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the compositions. In some embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In some embodiments, the treatment fluid may include a mixture of one or more aqueous fluids with other fluids and/or gases, including but not limited to emulsions, foams, and the like.

In some embodiments, the binder composition can further include a gelling agent, a friction reducer, a crosslinker, a surfactant, a foaming agent, a stabilizer, or any combination thereof for forming a fracturing fluid.

The salt-substituted clay stabilizer can be selected from choline chloride, choline hydroxide, choline bitartrate, tricholine citrate, choline bicarbonate, or any combination thereof. The salt-substituted clay stabilizer can be a quaternary ammonium compound selected from compounds described in patent publications US 2004/0235677 and U.S. Pat. No. 9,738,823. Other salt-substituted clay stabilizers can also be selected including compounds described in U.S. Pat. Nos. 7,284,610 and 11,084,974.

The salt-substituted clay stabilizer can be one or more inorganic salts such as NaCl, KCl, or $CaCl_2$. The salt-substituted clay stabilizer can be an amine-based clay control additives such as ammonium chloride, ammonium acetate, ammonium hydroxide, tetraalkyl ammonium chloride (tetramethylammonium chloride, tetraethylammonium chloride, and the like), tetraalkylammonium hydroxide (tetrabutylammonium hydroxide, and the like), and polymers of the associated species. The salt-substituted clay stabilizer can be a bis-quaternary amine (e.g., N,N,N,N',N',N'-trimethyl-1,3-diamino-2-propanol dichloride), a poly-bis-quaternary amine (e.g., poly{N-(N',N',N'-trimethyl,N'',N''-dimethyl-4,6-diamino-5-propanol)-3-propyl]-2-methylpropanamide dichloride}), and the like.

The treatment fluid, comprising of an aqueous silicate binder composition of the type disclosed herein, can be foamed using suitable foaming agent(s) for enhancing effectiveness of treatment fluid distribution and reducing treating volume in long intervals with wide permeability differences.

In some embodiments, the treatment fluid may be foamed. In some embodiments, the treatment fluid may be a pill optionally foamed. One advantage of using a foamed pill over a non-foamed version is that less of the aqueous fluid may be used, relatively speaking. This may be important in subterranean formations that are water-sensitive or under pressure. In some embodiments, the foamed pills have a foam quality of about 30% or above. These may include commingled fluids. A preferred foam quality level is about 50% or above.

When the pill is foamed, the pill may comprise an additional surfactant. The choice of whether to use an additional surfactant will be governed at least in part by the mineralogy of the formation and the composition of the viscoelastic surfactant. As will be understood by those skilled in the art, anionic, cationic, nonionic, or amphoteric surfactants also may be used so long as the desired foaming properties are displayed under the conditions. For example, in some embodiments, mixtures of cationic and amphoteric surfactants may be used. When used in some pill embodiments, the surfactant is present in an amount of from about 0.01% to about 5% by volume. When foamed, the base fluid may comprise a gas. While various gases can be utilized for foaming the pills, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80%. The amount of gas to incorporate into the fluid may be affected by factors including the viscosity of the fluid and bottomhole pressures involved in a particular application. Examples of preferred foaming agents that can be utilized to foam the base fluid and/or the delayed tackifying composition include, but are not limited to, alkylamidobetaines such as cocoamidopropyl betaine, alpha-olefin sulfonate, trimethyltallowammonium chloride, $C_8$ to $C_{22}$ alkylethoxylate sulfate, and trimethylcocoammonium chloride. Other suitable foaming agents and foam-stabilizing agents may be included as well, which will be known to those skilled in the art with the benefit of this disclosure. The foaming agent is generally present in a pill for some embodiments in an amount in the range of from about 0.01% to about 5%, by volume, more preferably in the amount of from about 0.2% to about 1%, and most preferably about 0.6% by volume.

In some embodiments, one or more surfactants may be added to the treatment fluid with or absent a foaming agent. In such embodiments, the one or more surfactants may enhance or improve penetration of the treatment fluid. In some embodiments, the one or more surfactants may be a nonionic or an ionic surfactant. Examples of suitable nonionic surfactants include, but are not limited to, alkoxylated linear alcohols, alkoxylated alkyl phenols, fatty acid esters, amine and amide derivatives, alkylpolyglucosides, ethylene oxide and propylene oxide copolymers polyalcohols and alkoxylated polyalcohols, and any combination thereof. Ionic surfactants can be cationic and anionic surfactants. Cationic surfactants that may be suitable for certain embodiments include, but are not limited to, arginine methyl esters, alkanolamines, alkylenediamines, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, $C_8$ to $C_{22}$ alkylethoxylate sulfate, trimethylcocoammonium chloride, derivatives thereof, and combinations thereof, for example. Types of anionic surfactants that may be suitable for certain embodiments of the present disclosure include, but are not limited to, alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, phosphate esters alkyl carboxylates, alkylether carboxylates, N-acylaminoacids, N-acylglutamates, N-acylpolypeptides, alkylbenzenesulfonates, paraffinic sulfonates, a-olefinsulfonates, lignosulfates, derivatives of sulfosuccinates, polynapthylmethylsulfonates, alkylsulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof, for example.

In some embodiments, the binder composition can be coated onto particulate material (e.g., proppant such as sand) and the coated material can be placed downhole (e.g., pumped downhole in treatment fluid such as a proppant laden slurry). The binder composition can be placed on the proppant material prior to forming the treatment fluid (e.g., the binder composition can be sprayed onto the particulate material, for example while the particulate material is being moved on a conveyor, being augered by a sand screw, or while the particulate material is being stored at the wellsite before mixing to form the treatment fluid). The binder composition can be placed on the proppant material concurrent with forming the treatment fluid. For example, components of the binder composition (e.g., an alkali metal silicate, a dehydrating agent, and an aqueous fluid) can be combined with particulate material in a blender or mixer tub along with sufficient excess water to form a pumpable treatment fluid (e.g., proppant laden slurry. The method can further include contacting one or more additives including a gelling agent, a friction reducer, a crosslinker, or any combination thereof with the treatment fluid comprising the coated particulate material.

In some embodiments, the alkali metal silicate comprises about 1 to about 25 w/w % based on a total weight of the coated particulate material. The coated particulate material is the weight of the coating plus particulate material, e.g., proppant, minus aqueous fluid. The dehydrating-activator agent can include about 1 to about 25 w/w % based on a total weight of the coated particulate material.

In some embodiments, the binder composition can be applied to in situ to particulate material present in the wellbore and/or surrounding formation. Such particulate material can be consolidated in place downhole via contact with the binder composition, and such particulate material can include sand, fines, gravel (e.g., gravel pack), proppant (e.g., consolidated proppant pack), or any combination thereof.

Suitable proppants include, but are not limited to, sand, bauxite, a ceramic, a glass, a polymer, polytetrafluoroethylene, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments.

Figure 2:
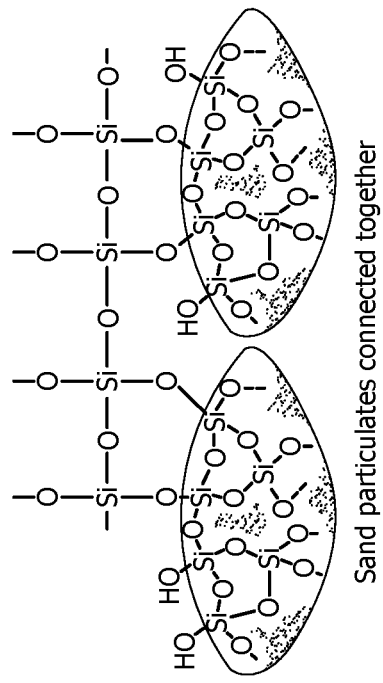
FIG. 2 illustrates the coupling of organo-siloxane or polysiloxane as part of a metal silicate binder composition to provide hydrophobicity for resisting water from attacking the bonds formed between consolidated sand grains.
Figure 2:
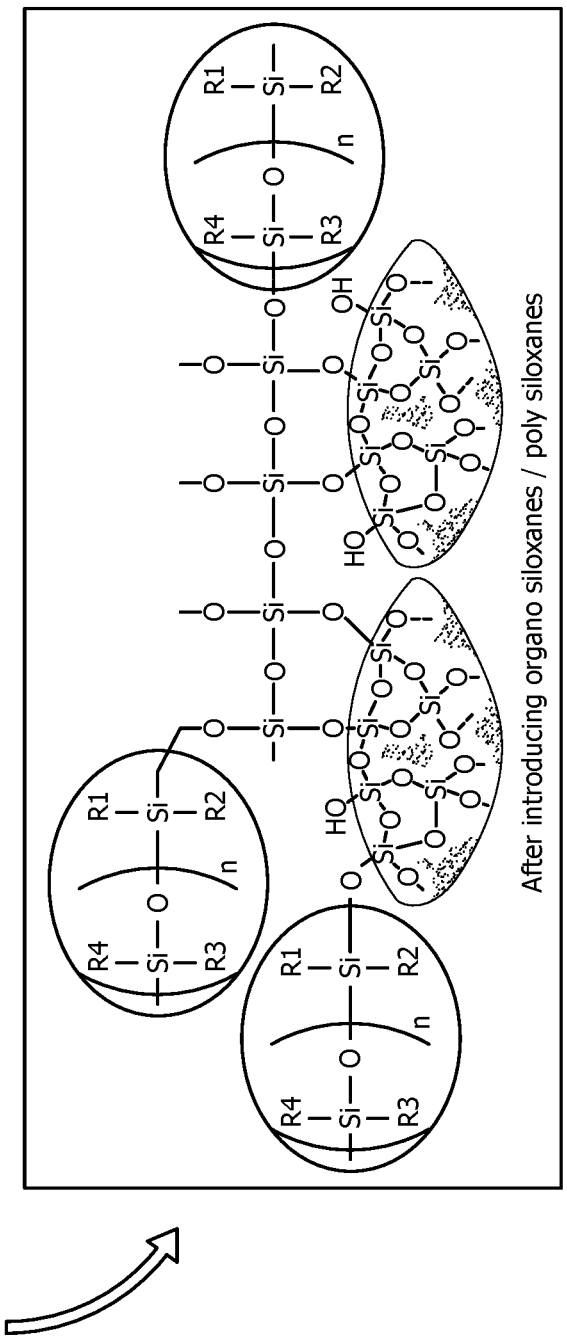

In some embodiments, the binder composition including an alkali metal silicate and a silicate bonding activator can be placed downhole or mixed with particulates, such as sand particulates. Although not wanting to be bound by theory, an alkali metal silicate, such as a sodium silicate as depicted in FIG. 1, can be activated with the silicate bonding activator to form a silica gel terminating in hydroxide. Often particles, such as sand terminate in hydroxide groups as well. When the silica gel contacts sand particles, the gel can bind with one or more sand particles via an oxide ion linking silicon atoms present in the gel and sand particle(s). These linkages can consolidate multiple sand particles. In some embodiments, the alkali metal silicate can include an organosiloxane to further aid consolidation of the sand particles, as depicted in FIG. 2.

The method can further include separately placing components of the binder composition downhole, for example by mixing the alkali metal silicate with aqueous fluid to form a first part and mixing the dehydrating-activator agent with the aqueous fluid to form a second part, and separately placing the first and second parts downhole where then combine to form the binder composition and contact/consolidate particulate material present in the wellbore, the surrounding formation, or both.

The method can further include placing the particulate material downhole, placing the binder composition downhole (e.g., the alkali metal silicate, dehydrating-activator agent downhole, aqueous fluid, and optionally a surfactant downhole), and contacting the binder composition and with the particulate material to form consolidated material. The aqueous fluid, the alkali metal silicate, and dehydrating-activator agent can combine to form the binder composition and contact the particulate material downhole for a predetermined period of time to consolidate the particulate material. The placing of the binder composition may be conducted proximate to drilling, treating, producing, or fracturing the subterranean formation to facilitate the binder composition consolidating the particulate material, which may include in situ particulate material.

In some embodiments, the method, such as drilling or secondary operations, such as fracturing, may further include placing the alkali metal silicate downhole, and then placing the dehydrating-activator agent downhole. The aqueous fluid, the alkali metal silicate, and dehydrating-activator agent can combine to form the binder composition, and contact and consolidate the particulate material placed downhole. In some embodiments, the method can further include placing a spacer after placing the alkali metal silicate to prevent contact with the dehydrating-activator agent. The placing of at least one material of the binder composition may be conducted proximate to drilling or fracturing the subterranean formation. The particulate material can be in situ and the wellbore may be for geothermal operations.

In some embodiments, such as those applying to operations for placing a treating fluid downhole, the placing of the treatment fluid can be conducted in one or more steps and the placing of the alkali metal silicate and dehydrating-activator agent may be combined with an aqueous fluid to form the binder composition and placed downhole in one or more steps. The method may further include contacting the binder composition and the particulate material for a predetermined amount of time to consolidate the particle material. The placing of at least one material of the binder composition can be conducted proximate to treating the subterranean formation. In some embodiments, the aqueous fluid can be combined with the alkali metal silicate and dehydrating-activator agent to form a binder composition and comprised in a drill-in fluid, and further including placing the drill-in fluid downhole, and permeating the subterranean formation with the drill-in fluid during production intervals to consolidate the particulate material in the subterranean formation.

In some embodiments, the method being applicable to, e.g., drilling or secondary operations, such as fracturing, may further include combining the alkali metal silicate, dehydrating-activator agent, aqueous fluid, and optionally a surfactant to form the binder composition, and placing the binder composition downhole in one or more steps to contact the particulate material (e.g., a proppant pack) for a predetermined amount of time. The method can further comprise placing another particulate material downhole, placing another binder composition downhole, placing a gelling agent and/or a friction reducing agent downhole, or a combination thereof. The placing of at least one material can be conducted proximate to producing, or fracturing the subterranean formation.

In some embodiments, a method of servicing a subterranean formation penetrated by a wellbore can include combining an alkali metal silicate, a dehydrating-activator agent and aqueous fluid to form a binder composition, contacting the binder composition with a particulate material, adhering the binder composition to the particulate material to form a composite material, and placing the composite material downhole (e.g., in a pumpable slurry). The method can further include prior to forming the binder composition, fracturing the wellbore to produce a plurality of fractures, and prior to adhering, suspending the contacted particulate material in the treatment fluid (e.g., a proppant laden fracturing fluid). The method can further include after placing the composite material downhole, depositing the composite material in the plurality of fractures, curing the binder composition of the composite material, and consolidating the particulate material to form permeable, consolidated complexes to fix the particulate material in the wellbore, the subterranean formation, or both.

In some embodiments, a consolidation complex can include a particulate material comprising silica, and an organosiloxane bonding at least two particles of the particulate material. The organosiloxane can include a siloxane backbone with one or more hydrophobic groups, and the consolidation complex can be of a formula as depicted in FIG. 2, wherein groups R1 to R4 are, independently, hydroxy or an alkyloxy group. The alkyloxy group can be, independently, a $C_1$ to $C_8$ alkyloxy group. The alkyloxy group can be an ethoxy group, and at least one of R1 to R4 can be an alkyloxy group.

The treatment fluid including the binder composition can provide a system that meets health, safety, and environment requirements in various regions, such as the North Sea and European countries. The treatment fluid can include a geopolymer, inorganic agent that can be environmentally compatible. Particularly, the siloxane polymers of some embodiments are environmentally safe as also being used in cosmetics and pharmaceuticals. The treatment fluids have a great variety of uses, such as treatment for sand control, fines migration control, proppant flowback control based on the desirable consolidation strengths of the treated particulates.

In some embodiments, the treatment fluid can be foamed for enhancing effective placement in long intervals of formation sand, or of propped fractures, with highly contrast permeabilities. The treatment fluid can have a high flashpoint and low viscosity similar to water. Low viscosity permits placement in the targeted zone easier than existing high viscosity resin systems. Moreover, the treatment fluid is useable over a wide range of temperatures, provides high consolidation strengths to treated particulate packs. Additionally, the treatment fluids maintain high regained permeability consolidated sand pack as capillary action tends to pull the binding agent to contact points between particulates to aid maintaining voids in pore spaces. Furthermore, the coupling of a silane, organo-siloxane, or polysiloxane in the silicate binder composition provides resistance of water from attacking the bonds formed between particulates to maintain consolidation strength of the treated sand pack. The components of the treatment fluid have a much lower cost as compared to other curable resin systems and are widely available alleviating supply chain issues.

A method of prevention fracture particle flowback during a hydraulic fracturing treatment from a subterranean zone penetrated by a well bore comprises the steps of: (a) forming one or more fractures in the subterranean zone; (b) coating dry micro-proppant, fracturing sand, or proppant particulates with a curable composition, wherein the curable liquid composition comprising a mixture of an alkali metal silicate and a silicate bonding activator; (c) suspending the coated particulates in a fracturing fluid; (d) depositing the coated particulates in the created fractures; (e) allowing the curable composition coated on the particulates to cure and transform the coated particulates placed in the fractures into permeable, consolidated masses to hold the particulates in place during well production or injection.

A method of prevention fracture particle flowback during a hydraulic fracturing treatment from a subterranean zone penetrated by a well bore comprises the steps of: (a) forming one or more fractures in the subterranean zone; (b) introducing a particulate-containing fracturing fluid into the fractures, wherein the particulates comprise micro-proppant, fracturing sand, and/or proppant; (c) admixing at least a portion of the particulates in the fluid with a liquid or solution of a curable composition, whereby at least a portion of the particulates is at least partially coated by the curable composition, and wherein the curable composition comprises a mixture of an alkali metal silicate and a silicate bonding activator; (d) depositing the coated particulates in the fractures; (e) allowing the curable composition coated on the particulates to cure and transform the coated particulates placed in the fractures into permeable, consolidated masses to hold the particulates in place during well production or injection.

In some embodiments, either the alkali metal silicate or the silicate bonding activator is dry coated on the sand/proppant particulate while the other component is added to the fracturing fluid for wet coating on the particulates during a hydraulic fracturing treatment.

In some embodiments, a method of consolidating fracturing sand or proppant particulates that have been placed in the propped fractures comprises: injecting a pre-flush volume of an aqueous fluid into the perforated intervals of interest for conditioning the fracturing sand or proppant particulates placed in the propped fractures to accept the coating of the curable composition to be injected as part of the remedial treatment fluid; injecting a treatment volume of an aqueous-based curable composition into the perforated intervals to treat the frac sand or proppant placed in the propped fractures, wherein the aqueous-based curable composition comprises an aqueous fluid, an alkali metal silicate, and a silicate bonding activator; and allowing the treated particulates to cure for a period of time depending on formation temperature, thereby transforming the treated particulates into permeable, consolidated masses to hold the particulates in place during well production or injection.

In some embodiments, similar to at least one embodiment above, the treatment of aqueous-based curable composition comprises an aqueous fluid containing an alkali metal silicate and an aqueous fluid containing a silicate bonding activator. These two fluids can be injected into the propped fractures sequentially to treat the fracturing sand or proppant particulates placed therein.

In some embodiments, a fracturing fluid slurry containing a mixture of an aqueous-based curable composition and a microproppant, or a mixture of curable composition and a fracturing sand or proppant, is injected into the previously propped fractures as part of a remedial treatments to restimulate the fractured well.

In some embodiments, a treatment fluid comprising an aqueous-based curable composition is used in treating the proppant (and/or microproppant) placed in the propped fractures and the formation particulates surrounding the wellbores that have been completed for geothermal operations.

In some embodiments, a treatment fluid comprising an aqueous-based curable composition and a micro-proppant (i.e., ≤1 ppg) is injected at low injection rate into the propped fractures as part of a remedial treatment for restimulating the previously fractured and produced intervals.

In some embodiments, a treatment fluid comprising an aqueous-based curable composition is injected into a formation interval, or a propped fracture interval, after an acidizing treatment, as part of a post-acid treatment fluid for stabilizing the formation fines particulates to fix in place and prevent them from invading the propped fractures, or producing into the wellbore during well production.

In some embodiments, a method of consolidating particulates in the formation surrounding the wellbore comprises: injecting a pre-flush volume of an aqueous fluid into the intervals of interest for conditioning the formations surrounding the wellbore to accept the coating of the curable composition to be injected in the treatment fluid stage; injecting a treatment volume of an aqueous-based curable composition comprising an aqueous fluid, an alkali metal silicate, and a silicate bonding activator, into the intervals to treat the particulates in the formations; and allowing the treated particulates to cure for a period of time depending on formation temperature, thereby transforming the treated formation particulates into a permeable, consolidated mass to hold the particulates in place during well production or injection.

In some embodiments, the individual components of the binder composition can be sequentially injected and placed into one or more formation intervals, perforated intervals, or propped fracture intervals. Spacer fluids are optionally applied to separate the metal silicate solution from comingling with the silicate bonding activator solution.

In some embodiments, the aqueous pre-flush fluid used in pre-conditioning the formations surrounding the wellbore, or the fracturing sand or proppant packed in the propped fractures, comprises an aqueous fluid and a mutual solvent for enhancing dispersing and removing oil residues from the particulate surfaces.

In some embodiments, a method of consolidating particulates in the formations surrounding the wellbore and the faces of fractures generated by hydraulic fracturing, or frac-pack treatments in weakly consolidated, unconsolidated, or clay-laden formations, comprises: injecting a pre-flush volume of an aqueous fluid into the intervals of interest for conditioning the formations surrounding the wellbore to accept the coating of the curable composition to be injected in the treatment fluid; injecting a treatment volume of a curable composition comprising an aqueous fluid, an alkali metal silicate, and a silicate bonding activator, into the intervals to treat the particulates in the formations; allowing the treated particulates to cure for a period of time depending on formation temperature, thereby transforming treated formation particulates into permeable, consolidated mass; injecting fracturing fluid into the treated interval to create one or more fractures extending from the wellbore and bypassing the consolidated near-wellbore region into the formation; injecting a curable, sand-laden fracturing fluid into the fractured interval, wherein the curable, sand-laden fracturing fluid comprises an aqueous fluid, a gelling agent (and/or friction reducing agent), a fracturing sand (or proppant), and a curable composition; allowing the aqueous effluent containing the curable composition to permeate and penetrate a portion of the formation through which the fractures extend to cure into permeable, consolidated masses; and allowing the fracturing sand that has been deposited in the fractures and coated with the curable composition to cure and consolidate into hard permeable masses.

In some embodiments, a method of consolidating particulates in the formation of the production interval surrounding the wellbore generated during drilling weakly consolidated/unconsolidated, production intervals as the aqueous curable composition is part of the drill-in fluid composition, comprises allowing the aqueous curable composition in the drill-in fluid to leakoff and permeate into the formations surrounding the wellbore of the production interval, thereby transforming the unconsolidated or weakly consolidated formations into permeable, competent rock, wherein the aqueous curable composition comprising an aqueous fluid, an alkali metal silicate, and a silicate bonding activator.

The following enumerated embodiments are non-limiting examples of the subject matter of the present disclosure:

A first embodiment, which is a method of servicing a well having a wellbore extending from a surface wellsite and penetrating a subterranean formation, comprising: (i) contacting a binder composition with particulate material, and (ii) binding the particulate material with the binder composition to form consolidated particulate material in the wellbore, in the formation, or both, wherein the binder composition comprises an aqueous fluid, an alkali metal silicate, and a silicate bonding activator.

A second embodiment which is the method of the first embodiment, wherein the (i) contacting occurs at the surface and the particulate material comprises proppant (e.g., micro-proppant, fracturing sand, proppant particulates, or combinations thereof).

A third embodiment which is the method of the second embodiment, wherein the proppant is dry and wherein the (i) contacting further comprises: contacting the dry proppant (e.g., dry micro-proppant, dry fracturing sand, dry proppant particulates, or combinations thereof) with the binder composition to form coated proppant (e.g., treated with or at least partially coated with the binder composition), forming a proppant-laden fracturing fluid comprising the coated proppant and an aqueous carrier fluid, pumping the proppant-laden fracturing fluid via the wellbore into fractures of the subterranean formation, and depositing the coated proppant into at least a portion of the fractures prior to the (ii) binding.

A fourth embodiment which is the method of the second embodiment, wherein the (i) contacting further comprises: combining an aqueous carrier fluid, the proppant, and the binder composition to form a proppant-laden fracturing fluid comprising coated proppant; pumping the proppant-laden fracturing fluid via the wellbore into at least a portion of the fractures; depositing the coated proppant into at least a portion of the fractures prior to the (ii) binding.

A fifth embodiment which is the method of the second embodiment, wherein the (i) contacting further comprises: contacting a liquid first component of a binder composition with dry proppant (e.g., dry micro-proppant, dry fracturing sand, dry proppant particulates, or combinations thereof) to form pre-treated proppant, combining an aqueous carrier fluid, the pre-treated proppant and a second component of the binder composition to form a proppant-laden fracturing fluid comprising coated proppant, wherein the first component of the binder composition comprises an alkali metal silicate or a silicate bonding activator, wherein the second component of the binder composition comprises an alkali metal silicate or a silicate bonding activator, and wherein the first component of the binder composition is different than the second component of the binder composition; pumping the proppant-laden fracturing fluid via the wellbore into at least a portion of the fractures; and depositing the coated proppant into at least a portion of the fractures.

A sixth embodiment which is the method of the first embodiment, wherein the (i) contacting occurs downhole.

A seventh embodiment which is the method of the sixth embodiment, wherein the particulate material comprises: (a) proppant (e.g., micro-proppant, fracturing sand, proppant particulates, or combinations thereof) deposited in fractures of the subterranean formation (e.g., consolidation of proppant bed/pack for flowback control); (b) formation particulates (e.g., consolidation of formation sands and formation fines, for example in weakly consolidated, unconsolidated, or clay-laden intervals of the formation); (c) gravel, sand, or both adjacent a sand control screen (e.g., consolidation of sand screen completion); (d) particulates adjacent to a face, surface, or wall of the wellbore (e.g., consolidation while drilling through production zone in unconsolidated, weakly consolidated, or clay-laden interval of the formation); (e) particulates adjacent to a face or surface of the fracture (e.g., consolidation while fracturing in unconsolidated, weakly consolidated, or clay-laden interval of the formation); or (f) any combination of (a)-(e).

An eighth embodiment which is the method of the sixth embodiment, further comprising prior to the (i) contacting, pumping a pre-flush fluid into the wellbore and contacting the particulate material with the pre-flush fluid.

A ninth embodiment which is the method of the eighth embodiment, wherein the pre-flush fluid is acidic, an aqueous fluid, or comprises a mutual solvent.

A tenth embodiment which is the method of the sixth embodiment, wherein the liquid binder composition is foamed, is an emulsion, or both.

An eleventh embodiment which is the method of the sixth embodiment, wherein the binder composition comprises a first aqueous component comprising the alkali metal silicate and a second aqueous component comprising the silicate bonding activator and wherein the (i) contacting further comprises: sequentially contacting at least a portion of the proppant present in fractures of the subterranean formation with the first aqueous component comprising the alkali metal silicate followed by an optional spacer fluid, followed by the second aqueous component comprising the silicate bonding activator; sequentially contacting at least a portion of the proppant present in fractures of the subterranean formation with the second aqueous component comprising the silicate bonding activator followed by an optional spacer fluid followed by the first aqueous component comprising the alkali metal silicate; or simultaneously contacting at least a portion of the proppant present in fractures of the subterranean formation with the first aqueous component comprising the alkali metal silicate and the second aqueous component comprising the silicate bonding activator.

A twelfth embodiment which is the method of any of the first to eleventh embodiments, wherein the (ii) binding further comprises allowing a silica gel formed by the alkali metal silicate and the silicate bonding activator to adhere to the surface of the particulate material to form the consolidated particulate material, wherein adhering to the surface includes allowing the binding composition to react with sand particulates such that bonds are formed between hydroxyl groups present on silica gel and on the sand surfaces (e.g., bonding between hydroxyl groups present in silica gel and on the surface of sand).

A thirteenth embodiment which is the method of the twelfth embodiment, wherein the silica gel adheres to the surface of the particulate material via a plurality of —Si—O—Si— linkages.

A fourteenth embodiment which is the method of the thirteenth embodiment, wherein the plurality of —Si—O—Si— linkages are formed in the presence of a dehydrating-activator agent such as a hydrolyzable ester.

A fifteenth embodiment which is the method of the twelfth embodiment, further comprising functionalizing the silica gel, the surface of the particulate material, or both with a hydrophobic functional group.

A sixteenth embodiment which is the method of the fifteenth embodiment, wherein the hydrophobic functional group is derived from an organo-siloxane, a poly-organo-siloxane, or combinations thereof, wherein the organosiloxane, the poly-organo-siloxane, or combinations thereof may be present in the binder composition (e.g., as the silicate bonding activator), may be placed downhole subsequent to the binder composition (e.g., as a post-flush with or after a spacer fluid), or both.

A seventeenth embodiment which is the method of fifteenth embodiment, wherein the hydrophobic functional group has the following structure:

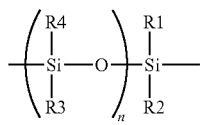

wherein each R1-R4 is independently a $C_1$-$C_5$ alkyl group and n=1 to 20.

An eighteenth embodiment which is the method of any of the first to seventeenth embodiments, wherein the well comprises a geothermal injection well, a geothermal production well, or both and wherein water is circulated down the injection well, through at least a portion of the consolidated material where the water is heated, and up the production well for use with geothermal energy recovery equipment.

A nineteenth embodiment which is a method of preventing flowback of proppant during a hydraulic fracturing treatment of a zone of a subterranean formation penetrated by a well bore, comprising: (i) forming one or more fractures in the zone of the subterranean formation; (ii) contacting a liquid binder composition with dry proppant (e.g., dry micro-proppant, dry fracturing sand, dry proppant particulates, or combinations thereof) to form coated proppant (e.g., at least partially coated with the binder composition), wherein the liquid binder composition comprises an aqueous fluid, an alkali metal silicate, and a silicate bonding activator; (iii) forming a proppant-laden fracturing fluid comprising the coated proppant and an aqueous carrier fluid; (iv) pumping the proppant-laden fracturing fluid via the wellbore into at least a portion of the fractures; (v) depositing the coated proppant into at least a portion of the fractures; and (v) allowing the binder composition on the coated proppant to form consolidated proppant material (e.g., to form permeable, consolidated masses) to hold the proppant in place during flow of fluids through the consolidated proppant bed (e.g., during flowback of fracturing fluid to recover an aqueous gel system for reuse, during production of hydrocarbons from the wellbore, during injection of a fluid into the wellbore such as during enhance oil recovery procedures, during injection and/or production of water from a geothermal well system).

A twentieth embodiment which is a method of preventing flowback of proppant during a hydraulic fracturing treatment of a zone of a subterranean formation penetrated by a well bore, comprising: (i) forming one or more fractures in the zone of the subterranean formation; (ii) combining an aqueous carrier fluid, proppant (e.g., micro-proppant, fracturing sand, proppant particulates, or combinations thereof), and a binder composition to form a proppant-laden fracturing fluid comprising coated proppant (e.g., at least partially coated with the binder composition), wherein the binder composition comprises an alkali metal silicate and a silicate bonding activator; (iii) pumping the proppant-laden fracturing fluid via the wellbore into at least a portion of the fractures; (iv) depositing the coated proppant into at least a portion of the fractures; and (v) allowing the binder composition on the coated proppant to form consolidated proppant material (e.g., to from permeable, consolidated masses) to hold the proppant in place during flow of fluids through the consolidated proppant material (e.g., during flowback of fracturing fluid to recover an aqueous gel system for reuse, during production of hydrocarbons from the wellbore, during injection of a fluid into the wellbore such as during enhance oil recovery procedures, during injection and/or production of water from a geothermal well system).

A twenty-first embodiment which is the method of twentieth embodiment, wherein the proppant-laden fracturing fluid comprises free or additional binder composition (e.g., not adhered to or coated on the proppant) available to contact and consolidate particulate matter present on faces or surfaces of the fractures (e.g., consolidation of fracture faces concurrent with depositing proppant); and further comprising contacting the free or additional binder composition with the particulate matter present on the faces or surfaces of the fractures and forming consolidated particulate material on the faces or surfaces of the fractures.

A twenty-second embodiment which is a method of preventing flowback of proppant during a hydraulic fracturing treatment of a zone of a subterranean formation penetrated by a well bore, comprising: (i) forming one or more fractures in the zone of the subterranean formation; (ii) contacting a liquid first component of a binder composition with dry proppant (e.g., dry micro-proppant, dry fracturing sand, dry proppant particulates, or combinations thereof) to form pre-treated proppant; (iii) combining an aqueous carrier fluid, the pre-treated proppant and a second component of the binder composition to form a proppant-laden fracturing fluid comprising coated proppant (e.g., at least partially coated with the binder composition), wherein the first component of the binder composition comprises an alkali metal silicate or a silicate bonding activator, wherein the second component of the binder composition comprises an alkali metal silicate or a silicate bonding activator, and wherein the first component of the binder composition is different than the second component of the binder composition; (iv) pumping the proppant-laden fracturing fluid via the wellbore into at least a portion of the fractures; (v) depositing the coated proppant into at least a portion of the fractures; and (vi) allowing the binder composition on the coated proppant to form consolidated proppant material (e.g., to from permeable, consolidated masses) to hold the proppant in place during flow of fluids through the consolidated proppant bed (e.g., during flowback of fracturing fluid to recover an aqueous gel system for reuse, during production of hydrocarbons from the wellbore, during injection of a fluid into the wellbore such as during enhance oil recovery procedures, during injection and/or production of water from a geothermal well system).

A twenty-third embodiment which is a method of consolidating proppant present in propped fractures of a subterranean formation, comprising: (i) optionally pre-flushing the proppant (e.g., micro-proppant, fracturing sand, proppant particulates, or combinations thereof); (ii) contacting a binder composition with the proppant to form coated proppant, wherein the binder composition comprises an aqueous fluid, an alkali metal silicate, and a silicate bonding activator; and (iii) allowing the binder composition on the coated proppant to form consolidated proppant material (e.g., to from permeable, consolidated masses) to hold the proppant in place during flow of fluids through the consolidated proppant bed (e.g., during flowback of fracturing fluid to recover an aqueous gel system for reuse, during production of hydrocarbons from the wellbore, during injection of a fluid into the wellbore such as during enhance oil recovery procedures, during injection and/or production of water from a geothermal well system).

A twenty-fourth embodiment which is the method of the twenty-third embodiment, wherein the binder composition comprises a first aqueous component comprising the alkali metal silicate and a second aqueous component comprising the silicate bonding activator and wherein the (ii) contacting further comprises: sequentially contacting at least a portion of the proppant present in fractures of the subterranean formation with the first aqueous component comprising the alkali metal silicate, followed by an optional spacer fluid, followed by the second aqueous component comprising the silicate bonding activator; sequentially contacting at least a portion of the proppant present in fractures of the subterranean formation with the second aqueous component comprising the silicate bonding activator, followed by an optional spacer fluid, followed by the first aqueous component comprising the alkali metal silicate; or simultaneously contacting at least a portion of the proppant present in fractures of the subterranean formation with the first aqueous component comprising the alkali metal silicate and the second aqueous component comprising the silicate bonding activator.

A twenty-fifth embodiment which is a method of consolidating particulate material present in a near-wellbore region of an interval (e.g., a production interval) of a subterranean formation penetrated by a wellbore, comprising: (i) optionally pre-flushing the near-wellbore region; (ii) contacting a binder composition with the particulate material (e.g., sand) in the near-wellbore region to form coated particulate material, wherein the binder composition comprises an aqueous fluid, an alkali metal silicate, and a silicate bonding activator; and (iii) allowing the binder composition on the coated particulate material to form consolidated particulate material in the near-wellbore region (e.g., to from permeable, consolidated masses) to hold the particulate material in place during flow of fluids through the consolidated particulate material (e.g., during production of hydrocarbons from the wellbore, during injection of a fluid into the wellbore such as during enhance oil recovery procedures, during injection and/or production of water from a geothermal well system).

A twenty-sixth embodiment which is the method of the twenty-fifth embodiment, wherein the binder composition comprises a first aqueous component comprising the alkali metal silicate and a second aqueous component comprising the silicate bonding activator and wherein the (ii) contacting further comprises: sequentially contacting at least a portion of the particulate material in the near-wellbore region with the first aqueous component comprising the alkali metal silicate, followed by an optional spacer fluid, followed by the second aqueous component comprising the silicate bonding activator; sequentially contacting at least a portion of the particulate material present in the near-wellbore region with the second aqueous component comprising the silicate bonding activator, followed by an optional spacer fluid, followed by the first aqueous component comprising the alkali metal silicate; or simultaneously contacting at least a portion of the particulate material present in the near wellbore region with the first aqueous component comprising the alkali metal silicate and the second aqueous component comprising the silicate bonding activator.

A twenty-seventh embodiment which is a method of servicing a well having a wellbore extending from a surface wellsite and penetrating a subterranean formation, comprising: (A) consolidating particulate material present in a near-wellbore region of a subterranean formation penetrated by a wellbore, comprising: (i) optionally pre-flushing the near-wellbore region; (ii) contacting a binder composition with the particulate material (e.g., sand) in the near-wellbore region to form coated particulate material, wherein the binder composition comprises an aqueous fluid, an alkali metal silicate, and a silicate bonding activator; and (iii) allowing the binder composition on the coated particulate material to form consolidated particulate material in the near well-bore region; (B) forming, with a proppant-free fracturing fluid, one or more fractures extending through the consolidated particulate material in the near-wellbore region and beyond the near-wellbore region into the surrounding formation; and (C) forming a consolidated proppant material in the fractures, comprising: (i) combining an aqueous carrier fluid, proppant (e.g., micro-proppant, fracturing sand, proppant particulates, or combinations thereof), and a binder composition to form a proppant-laden fracturing fluid comprising coated proppant (e.g., at least partially coated with the binder composition), wherein the binder composition comprises an alkali metal silicate and a silicate bonding activator; (ii) pumping the proppant-laden fracturing fluid via the wellbore into at least a portion of the fractures; (iii) depositing the coated proppant into at least a portion of the fractures; and (iv) allowing the binder composition on the coated proppant to form the consolidated proppant material (e.g., to from permeable, consolidated masses) to hold the proppant in place during flow of fluids through the consolidated proppant material (e.g., during flowback of fracturing fluid to recover an aqueous gel system for reuse, during production of hydrocarbons from the wellbore, during injection of a fluid into the wellbore such as during enhance oil recovery procedures, during injection and/or production of water from a geothermal well system).

A twenty-eight embodiment which is the method of twenty-seventh embodiment, wherein the proppant-free fracturing fluid comprises the binder composition and further comprising contacting the binder composition present in the proppant-free fracturing fluid with particulate matter present on the faces or surfaces of the fractures and forming consolidated particulate material on the faces or surfaces of the fractures (e.g., consolidation of fracture faces before depositing proppant).

A twenty-ninth embodiment which is a method of consolidating particulate material present in a near-wellbore region of an interval (e.g., a production interval) of a subterranean formation during drilling of a wellbore penetrating the interval (e.g., during drill-in of the production interval), comprising: (i) contacting a binder composition with the particulate material (e.g., sand) in the near-wellbore region (e.g., on the face, surface, or wall of the wellbore and/or a distance traveled from the interior of the wellbore into the formation via permeation and/or leakoff) to form coated particulate material, wherein the binder composition comprises an aqueous fluid, an alkali metal silicate, and a silicate bonding activator; and (ii) allowing the binder composition on the coated particulate material to form consolidated particulate material in the near-wellbore region (e.g., to from permeable, consolidated masses on the face, surface, or wall of the wellbore, a consolidated wellbore face) to hold the particulate material in place during drilling and completion operations such placing a tubular in the wellbore adjacent the consolidated wellbore face, placing cement in an annular space formed between the tubular and the consolidated wellbore face, and allowing the cement to set and adhere to the tubular and the consolidated wellbore face.

A thirtieth embodiment which is the method of twenty-ninth embodiment, wherein: (a) the binder composition is present in a drilling fluid (e.g., a drill-in fluid) during the (i) contacting; or (b) the binder composition is present as a spot fluid, a spacer fluid, or a fluid pill during the (i) contacting.

A thirty-first embodiment which is the method of any of the twenty-fifth to thirtieth embodiments, wherein a near-wellbore region comprises a radial distance from a central axis of the wellbore to a location in the formation of equal to or less than about 50, about 40, about 30, about 25, about 20, about 15, about 10, about 9, about 8, about 7, about 6, about 5, about 4, about 3, about 2, about 1, or about 0.5 feet.

A thirty-second embodiment which is the method of any of the first to thirty-first embodiments, wherein the alkali metal silicate is selected from the group consisting of a sodium silicate, a potassium silicate, a lithium silicate, and any combination thereof.

A thirty-third embodiment which is the method of the thirty-second embodiment, wherein the alkali metal silicate is further characterized as an orthosilicate, a metasilicate, a pyrosilicate, and any combination thereof.

A thirty-fourth embodiment which is the method of any of the first to thirty-third embodiments, wherein the silicate bonding activator comprises an organo-siloxane, a poly-organo-siloxane, or combinations thereof.

A thirty-fifth embodiment which is the method of any of the first to thirty-fourth embodiments, wherein the silicate bonding activator is selected from the group consisting of an alkylsilane, an alkoxysilane, an alkyltrialkoxysilane, a methyltrimethoxysilane, a methyltriethoxysilane, a glycidyloxypropyl trimethoxysilane, a γ-glycidyloxypropyl triethoxysilane, a 3-aminopropyl trimethoxysilane, a 3-aminopropyl triethoxysilane, a hydroxymethyl trialkoxysilane, a 3-hydoxypropyl trimethoxysilane, a 3-hydroxypropyl triethoxysilane, a N-hydroxyethylaminopropyl trialkoxysilane, a 2-methoxy(polyethyleneoxy)propyl trialkoxysilane, a N-2-(aminoethyl)-3-aminopropyl trimethoxysilane, a 3-glycidoxypropyl trimethoxysilane, a N-beta-(aminoethyl)-gamma-aminopropyl trimethoxysilane, a poly(alkoxysilane), a polyalkylsiloxane, a polyarylsilane, a polydimethylsiloxane, a polydiethylsiloxane, a polymethylethylsiloxane, a poly(dimethoxysiloxanes), a poly(diethoxysiloxanes), a polydiphenylsiloxane, a polydimethylsiloxane, a poly(diethoxysiloxanes), and any combination thereof.

A thirty-sixth embodiment which is the method of any of the first to thirty-fourth embodiments, wherein the silicate bonding activator is selected from the group consisting of a tetra-ethyl orthosilicate, a tetramethyl orthosilicate, a tetrapropyl orthosilicate, and any combination thereof.

A thirty-seventh embodiment which is the method of any of the first to thirty-sixth embodiments, further comprising a salt-substituted clay stabilizer selected from the group consisting of an inorganic salts such as NaCl, KCl, or $CaCl_2$; an amine-based clay control additives such as ammonium chloride, ammonium acetate, ammonium hydroxide, tetraalkyl ammonium chloride (tetramethylammonium chloride, tetraethylammonium chloride, and the like), tetraalkylammonium hydroxide (tetrabutylammonium hydroxide, and the like), and polymers of the associated species; a bis-quaternary amine (e.g., N,N,N,N',N',N'-trimethyl-1,3-diamino-2-propanol dichloride), a poly-bis-quateranary amine (e.g., poly{N-(N',N',N'-trimethyl,N'',N''-dimethyl-4,6-diamino-5-propanol)-3-propyl]-2-methylpropanamide dichloride}), the like; and any combination thereof.

A thirty-eighth embodiment which is the method of any of the first to thirty-first embodiments, wherein the binder composition comprises a water-soluble alkali metal silicate (e.g., sodium silicate, a poly-organo-siloxane (e.g., hydroxy-terminated polydimethylsiloxanes), and water (e.g., fresh water, salt water, or brine, preferably fresh water.).

A thirty-ninth embodiment which is a binder composition comprising any of the alkali metal silicates of the thirty-second or thirty-third embodiments, any of the silicate bonding activators of the thirty-fourth through thirty-sixth embodiments and optionally any of the salt-substituted clay stabilizers of thirty-seventh embodiment.

A fortieth embodiment which is the binder composition described in the thirty-eighth embodiment.

The invention claimed is:

1. A method of servicing a well having a wellbore extending from a surface wellsite and penetrating a subterranean formation, comprising:
   (i) contacting a binder composition with particulate material, and
   (ii) binding the particulate material with the binder composition to form consolidated particulate material in the wellbore, in the subterranean formation, or both,
   wherein the binder composition comprises an aqueous fluid, an alkali metal silicate, and a silicate bonding activator,
   wherein the (i) contacting occurs at the surface wellsite and the particulate material comprises proppant, and
   wherein the silicate bonding activator is selected from a group consisting of an alkylsilane, an alkoxysilane, an alkyltrialkoxysilane, a methyltrimethoxysilane, a methyltriethoxysilane, a glycidyloxypropyl trimethoxysilane, a γ-glycidyloxypropyl triethoxysilane, a 3-aminopropyl trimethoxysilane, a 3-aminopropyl triethoxysilane, a hydroxymethyl trialkoxysilane, a 3-hydoxypropyl trimethoxysilane, a 3-hydroxypropyl triethoxysilane, a N-hydroxyethylaminopropyl trialkoxysilane, a 2-methoxy(polyethyleneoxy)propyl trialkoxysilane, a N-2-(aminoethyl)-3-aminopropyl trimethoxysilane, a 3-glycidoxypropyl trimethoxysilane, a N-beta-(aminoethyl)-gamma-aminopropyl trimethoxysilane, a poly(alkoxysilane), a polyalkylsiloxane, a polyarylsilane, a polydimethylsiloxane, a polydiethylsiloxane, a polymethylethylsiloxane, a poly(dimethoxysiloxanes), a poly(diethoxysiloxanes), a polydiphenylsiloxane, a polydimethylsiloxane, a poly(diethoxysiloxanes), and any combination thereof.

2. The method of claim 1, wherein the proppant is dry and wherein the (i) contacting further comprises:
   contacting the dry proppant with the binder composition to form a coated proppant,
   forming a proppant-laden fracturing fluid comprising the coated proppant and an aqueous carrier fluid,
   pumping the proppant-laden fracturing fluid via the wellbore into fractures of the subterranean formation, and
   depositing the coated proppant into at least a portion of the fractures prior to the (ii) binding.

3. The method of claim 1, wherein the (i) contacting further comprises:
   combining an aqueous carrier fluid, the proppant, and the binder composition to form a proppant-laden fracturing fluid comprising coated proppant;
   pumping the proppant-laden fracturing fluid via the wellbore into at least a portion of the fractures; and
   depositing the coated proppant into at least a portion of the fractures prior to the (ii) binding.

4. The method of claim 1, wherein the (i) contacting further comprises:

contacting a liquid first component of the binder composition with dry proppant to form a pre-treated proppant;

combining an aqueous carrier fluid, the pre-treated proppant and a second component of the binder composition to form a proppant-laden fracturing fluid comprising coated proppant, wherein a first component of the binder composition comprises the alkali metal silicate or the silicate bonding activator, wherein the second component of the binder composition comprises the alkali metal silicate or the silicate bonding activator, and wherein the first component of the binder composition is different than the second component of the binder composition;

pumping the proppant-laden fracturing fluid via the wellbore into at least a portion of the fractures; and depositing the coated proppant into at least a portion of the fractures.

5. The method of claim 1, wherein the well comprises a geothermal injection well, a geothermal production well, or both and wherein water is circulated down the geothermal injection well, through at least a portion of a consolidated material where the water is heated, up the geothermal production well and in fluid communication with geothermal energy recovery equipment.

6. The method of claim 1, wherein the alkali metal silicate is selected from a group consisting of a sodium silicate, a potassium silicate, a lithium silicate, and any combination thereof.

7. The method of claim 6, wherein the alkali metal silicate is further characterized as an orthosilicate, a metasilicate, a pyrosilicate, or any combination thereof.

8. The method of claim 1, wherein the binder composition further comprises a salt-substituted clay stabilizer selected from a group consisting of NaCl, KCl, $CaCl_2$, ammonium chloride, ammonium acetate, ammonium hydroxide, tetraalkyl ammonium chloride, tetraalkylammonium hydroxide, a bis-quaternary amine, a poly-bis-quaternary amine, and any combination thereof.

9. The method of claim 1, wherein the alkali metal silicate comprises sodium silicate, the silicate bonding activator comprises hydroxy-terminated polydimethylsiloxane, and the aqueous fluid comprises fresh water.

10. The method of claim 1, wherein the (ii) binding further comprises allowing a silica gel formed by the alkali metal silicate and the silicate bonding activator to adhere to a surface of the particulate material to form a consolidated particulate material.

11. The method of claim 10, wherein the silica gel adheres to the surface of the particulate material via a plurality of —Si—O—Si— linkages.

12. The method of claim 10, further comprising functionalizing the silica gel, the surface of the particulate material, or both with a hydrophobic functional group.

13. The method of claim 12, wherein the hydrophobic functional group is derived from an organo-siloxane, a poly-organo-siloxane, or combinations thereof.

14. The method of claim 12, wherein the hydrophobic functional group has the following structure:

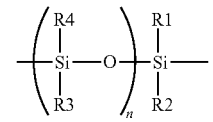

wherein each R1-R4 is independently a $C_1$-$C_8$ alkyl group and n=1 to 20.

15. A method of servicing a well having a wellbore extending from a surface wellsite and penetrating a subterranean formation, comprising:
(i) contacting a binder composition with particulate material, and
(ii) binding the particulate material with the binder composition to form consolidated particulate material in the wellbore, in the subterranean formation, or both,
wherein the binder composition comprises an aqueous fluid, an alkali metal silicate, and a silicate bonding activator,
wherein the (i) contacting occurs at the surface wellsite and the particulate material comprises proppant, and
wherein the silicate bonding activator comprises an organo-siloxane, a poly-organo-siloxane, or combinations thereof.

* * * * *